UNITED STATES PATENT OFFICE.

RAOUL PIERRE PICTET, OF WALSALL, ENGLAND.

MANUFACTURE OF FURNACE TUBES OR CHAMBERS.

1,130,533.  Specification of Letters Patent.  Patented Mar. 2, 1915.

No Drawing.  Application filed July 30, 1914.  Serial No. 854,162.

*To all whom it may concern:*

Be it known that I, RAOUL PIERRE PICTET, a citizen of the Swiss Republic, residing at 61 High Gate, Walsall, in the county of Stafford, England, have invented certain new and useful Improvements in the Manufacture of Furnace Tubes or Chambers, of which the following is a specification.

This invention relates to furnace tubes or chambers for gaseous reactions at high temperature and more especially to such furnace tubes as are required for the production of hydrogen or hydrogen mixtures from hydrocarbons.

The chief object of my present invention is to make the furnace or retort tubes or chambers in which the decomposition takes place of such material that they can withstand an extremely high temperature without penetration by any of the gases evolved in the process. The dissociation of compounds formed by exothermic reactions requires that the temperature of the gases surrounding the retort tubes should be considerably higher than the critical temperature of dissociation. The hydrocarbon vapors in the processes above referred to must be raised to a temperature of 1250° C. and to produce hydrogen in sufficient quantities the heating to which the tubes are subjected must reach temperatures rising in some cases even to 1500° C. With these high temperatures serious practical difficulties are encountered; iron tubes fuse, porcelain tubes lose their glaze and become porous, allowing the hydrogen to pass through the walls, while fireclay tubes are thick and remain porous.

The process demands special conditions to permit of regular and practical working, and the retort tubes must answer to the following conditions: (1). They must resist without deformation temperatures which may reach 1900° to 2000° centigrade. (2). The conductivity of their walls must be sufficient to allow the use of tubes of moderate length. (3). They must be strong and be capable of resisting shocks. (4). Their co-efficient of expansion must be as small as possible to avoid danger of leakage. (5). They must remain impermeable to hydrogen, even at the highest temperatures. (6). Their price must be moderate. (7). The tubes must be unattackable chemically, either by the external combustion gases, oxygen, carbonic acid, carbonic oxid, sulfurous vapors, etc., or by the internal gases, hydrogen, sulfureted hydrogen, water vapor, carbonic oxid, etc.

According to my invention I mix finely powdered silica, magnesia, alumina, lime, carborundum, calcium carbid or, in general, any very refractory body, with chemically produced carbon obtained in atomic or molecular conditions by the decomposition of hydrocarbons or other carbonaceous material, to produce a paste from which the retort tubes or chambers are made. The fineness of the carbon obtained by the dissociation of, for example, methane ($CH_4$) is such that the carbon mixed with the powdered metallic oxids or carbids renders the resulting material totally impermeable to hydrogen and the other gases even at the highest temperatures. The employment of chemically prepared carbon in finely divided condition distinguishes the present process from those already known, in which refractory materials are mixed with carbonaceous matter which is decomposed in the mixture by heating.

The proportion of carbon employed may vary, but about 30% of the total material is a suitable amount. It is necessary for making an efficient tube that the refractory material should be powdered very finely so as to come into intimate mixture with the carbon, which is of course in a much more finely divided condition than can be obtained by any grinding process such as is applied to the refractory material. In preparing the paste for the tubes the materials may be mixed with alcohol, chloroform, petroleum or other organic liquid, or with water, and the paste is then molded into the desired form and fired at a high temperature in a reducing atmosphere until incipient fusing or softening occurs.

When a very fine and intimately mixed paste has been obtained, so that all the particles of refractory material are surrounded by molecules of pure carbon, it must be given sufficient consistency to enable the tubes to withstand, without flattening or other deformation, the process of firing. For this purpose it is made as thick as is practicable for manipulation and is placed in a hydraulic press capable of exerting a very high pressure, from which press it is forced through a circular opening having a central disk, as in presses for making lead and iron pipes, emerging in perfectly cylindrical form and with smooth polished walls. The tubes are placed in a reverberatory furnace heated with water gas and oxygenated air having about 35% to 38% oxygen. The temperature of the gases is under perfect control and can be raised to from 2100° to 2500° C., causing incipient fusion and softening of the tube. To avoid deformation the temperature must not be raised too high and is controlled by regulating the percentage of oxygen in the gas supply. The time during which the tubes should be exposed to the maximum temperature must also be carefully determined.

By employing powdered magnetic iron oxid, alumina, silica, thorium or uranium oxid or other oxids, or tungsten, thorium, vanadium, chromium, titanium, platinum, osmium or other metallic powders of highly refractory metals, a large number of mixtures may be obtained which, mixed with the fine carbon produced from dissociated methane or other hydrocarbon, give the special properties required. Each mixture gives special consistency and a different softening point which allows the pastes to be classified for different purposes.

The tubes may be burnt by an electric current where they possess sufficient conductivity and the temperature is then under control electrically, while the tubes may be kept in shape by molds of graphite or other refractory material. The higher the heat conductivity of the resulting tube the greater the yield of hydrogen mixture and this fact should largely influence the choice of the constituents.

By the use in a furnace of a tube or tubes made in this manner the reactions may be carried out at a much higher temperature than has hitherto been possible, so that the production of the hydrogen or hydrogen mixture in the processes referred to may be greatly facilitated and larger quantities obtained for the same dimensions of furnace.

What I claim and desire to secure by Letters Patent of the United States is:—

1. A process of making furnace chambers consisting in mixing powdered refractory materials with finely divided carbon produced by the dissociation of a hydrocarbon, making a paste of such mixture and shaping and subsequently firing the said paste in a non-oxidizing atmosphere.

2. A process of making furnace chambers consisting in mixing powdered refractory oxids with finely divided carbon produced by the dissociation of a hydrocarbon, making a paste of such mixture and shaping and subsequently firing the said paste in a non-oxidizing atmosphere.

3. A process of making furnace chambers consisting in mixing powdered refractory materials with finely divided carbon produced by the dissociation of methane, making a paste of such mixture and shaping and subsequently firing the said paste in a non-oxidizing atmosphere.

4. A process of making furnace chambers consisting in mixing powdered refractory materials with finely divided carbon produced by the dissociation of a hydrocarbon, making a paste of such mixture and shaping and subsequently firing the said paste in a non-oxidizing atmosphere to such a temperature that it softens without deformation.

5. A process of making furnace chambers consisting in mixing powdered refractory materials with finely divided carbon produced by the dissociation of a hydrocarbon, making a paste of such mixture and shaping and subsequently heating the said paste to incipient fusion in a non-oxidizing atmosphere.

In testimony whereof I affix my signature in presence of two witnesses.

RAOUL PIERRE PICTET.

Witnesses:
T. SELBY WORDLE,
WALTER J. SKERTEN.